US012305821B1

(12) United States Patent
Amira

(10) Patent No.: US 12,305,821 B1
(45) Date of Patent: May 20, 2025

(54) LINEAR LIGHT MODULE

(71) Applicant: Brandon Amira, Miami, FL (US)

(72) Inventor: Brandon Amira, Miami, FL (US)

( * ) Notice: Subject to any disclaimer, the term of this patent is extended or adjusted under 35 U.S.C. 154(b) by 0 days.

(21) Appl. No.: 18/798,906

(22) Filed: Aug. 9, 2024

(51) Int. Cl.

| | |
|---|---|
| ***F21S 4/26*** | (2016.01) |
| *F21Y 103/00* | (2016.01) |
| *F21Y 113/00* | (2016.01) |
| *F21Y 115/10* | (2016.01) |

(52) U.S. Cl.
CPC ............. *F21S 4/26* (2016.01); *F21Y 2103/00* (2013.01); *F21Y 2113/00* (2013.01); *F21Y 2115/10* (2016.08)

(58) Field of Classification Search
CPC ........ F21S 4/26; F21S 4/20; F21S 4/22; F21S 4/23; F21K 9/26; F21K 9/237; F21Y 2103/00
See application file for complete search history.

(56) References Cited

U.S. PATENT DOCUMENTS

| | | | | |
|---|---|---|---|---|
| 6,866,394 B1 | 3/2005 | Hutchins | | |
| 7,347,606 B1 | 3/2008 | Patten | | |
| 8,764,220 B2 | 7/2014 | Chan | | |
| 11,746,969 B1 * | 9/2023 | Kay | .......................... | F21S 4/28 362/365 |
| 2004/0022061 A1 * | 2/2004 | Shih | .......................... | F21S 4/22 362/396 |

OTHER PUBLICATIONS

Innovation Q_ NPL Search (Year: 2024).*

* cited by examiner

*Primary Examiner* — Anabel Ton
(74) *Attorney, Agent, or Firm* — Defillo & Associates, Inc.; Evelyn A. Defillo

(57) ABSTRACT

A linear light module including a hollow housing; at least one U-shaped channel located in the hollow housing; a set of tracks located inside each one of the U-shaped channels; a top cover located at a top end of the hollow housing, a bottom cover located at a bottom end of the hollow housing; and an optionally mounting system located on a back section of the hollow housing. The flexible neon LED strip(s) and/or flexible rope light(s) are placed inside each one of the U-shaped channels.

5 Claims, 11 Drawing Sheets

LINEAR LIGHT MODULE

FIELD OF THE INVENTION

The present invention relates to linear lights, and more specifically, to a linear light module that houses flexible neon LED strip(s) (simulating the effect and look of neon in a continuous well-balanced light) or flexible rope light(s).

BACKGROUND OF THE INVENTION

It is well known in the prior art to use flexible neon LED strip(s) and/or flexible rope light(s) for lighting and/or decorating interior and exterior areas. The flexible neon LED strip(s) and/or flexible rope light(s) are in the form of a linear silicone tube with encapsulated light emitting diodes (LED). The flexible neon LED strip(s) and/or flexible rope light(s) can be mounted directly to a ceiling or wall or hanging.

Unfortunately, flexible neon LED strip(s) and/or flexible rope light(s) are not sturdy and require the use of a support to accommodate and protect the lighting system. The existing supports hold the flexible neon LED strip(s) and/or flexible rope light(s) but are difficult to control the direction of the light to the desired area.

There is a need to provide a linear light module that supports and accommodates the neon LED strip(s) and/or flexible rope light(s), and at the same time, allows the light to be guided to the required area.

SUMMARY OF THE INVENTION

The linear light module includes a hollow housing having at least one U-shaped channel, a set of tracks located inside each one of the channels, a top cover, a bottom cover, optionally and mounting system located on a back section of the hollow housing.

The neon LED strip(s) and/or flexible rope light(s) are placed inside the U-shaped channel.

DETAILED DESCRIPTION OF THE INVENTION

Figure 1:
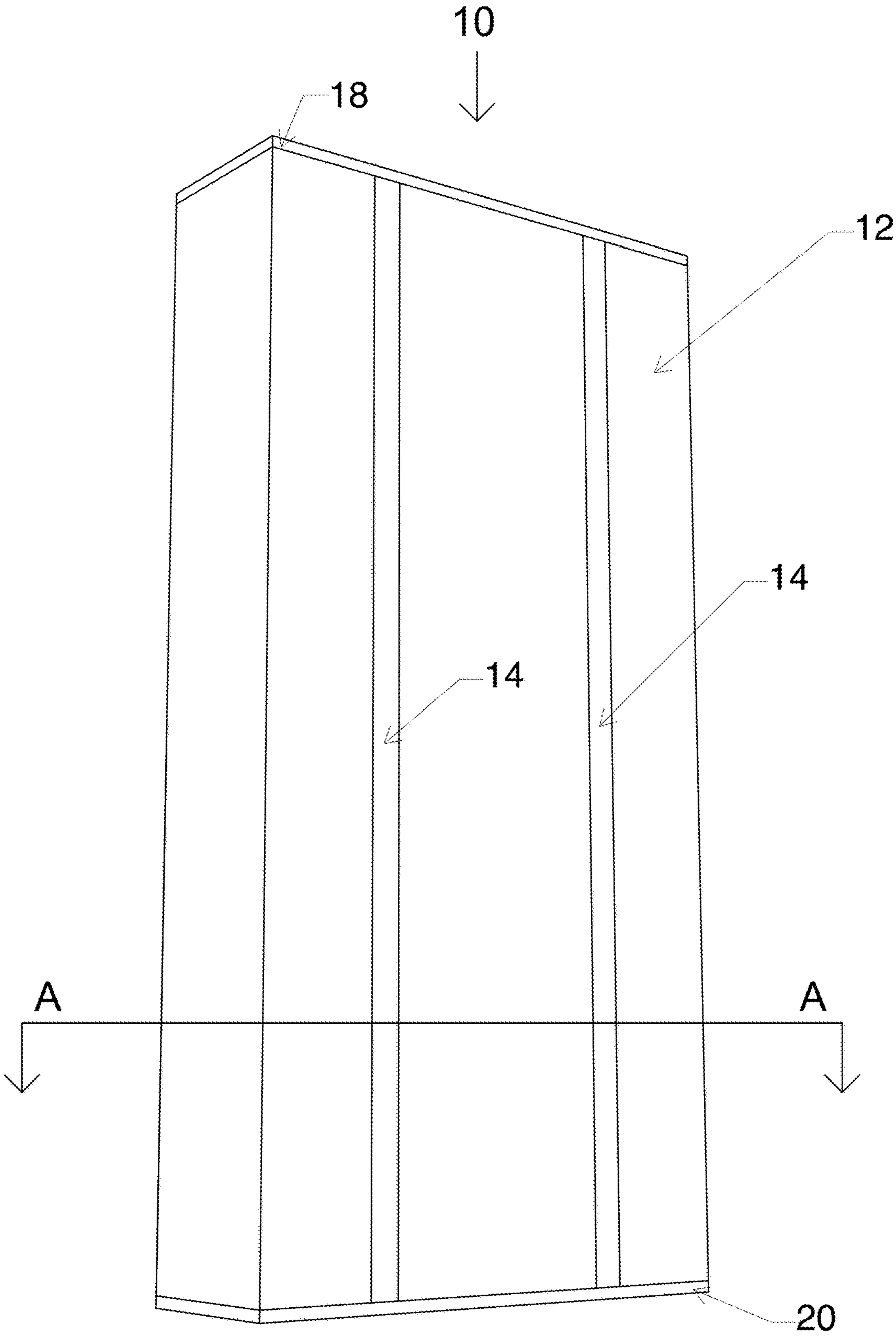
FIG. 1 shows a perspective front view of the linear light module according to the present invention.
Figure 2A:
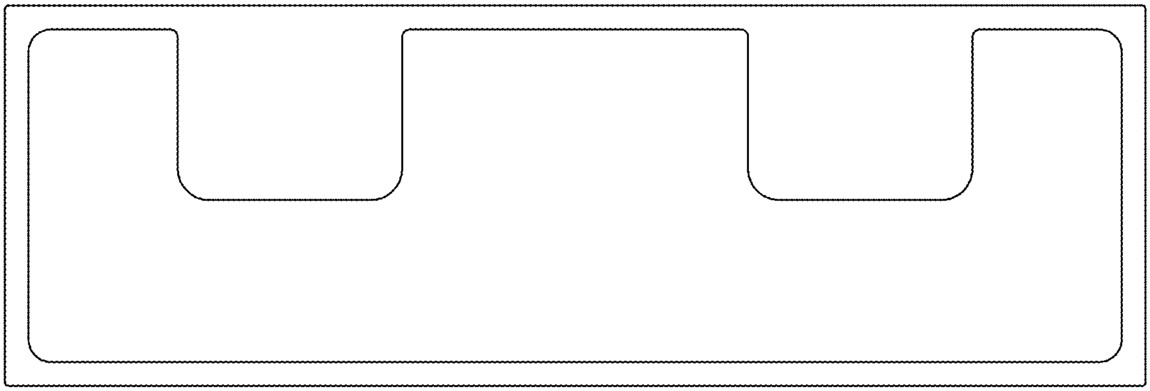
FIG. 2*a* shows a front view of the top cover of the linear light module of FIG. 1.
Figure 2B:
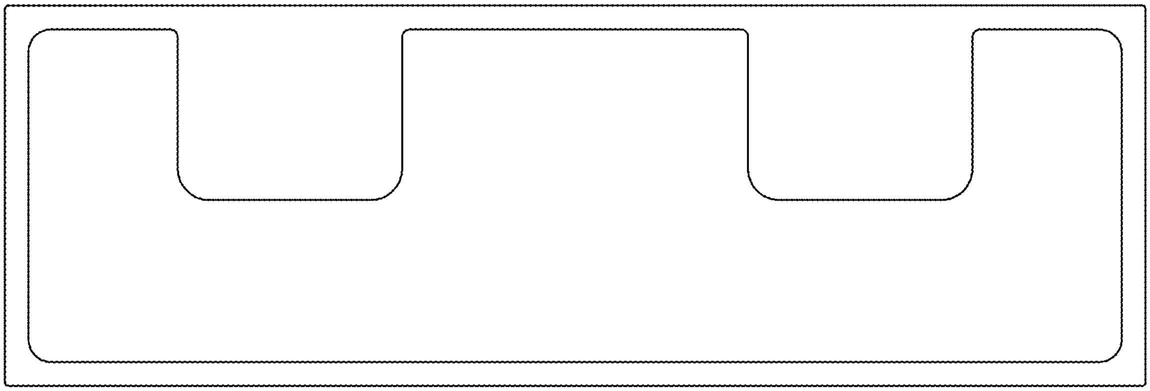
FIG. 2*b* shows a front view of the bottom cover of the linear light module of FIG. 1.
Figure 3:
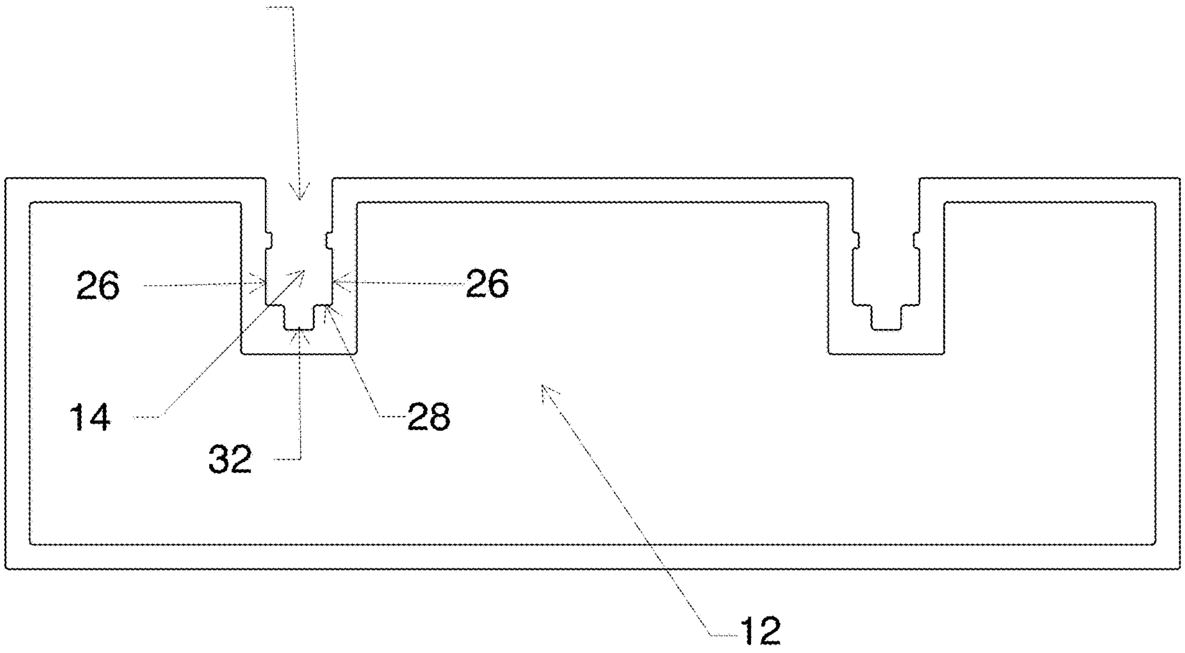
FIG. 3 shows a cross-sectional view taken along line AA of the linear light module of FIG. 1 including preferable measurements.
Figure 4:
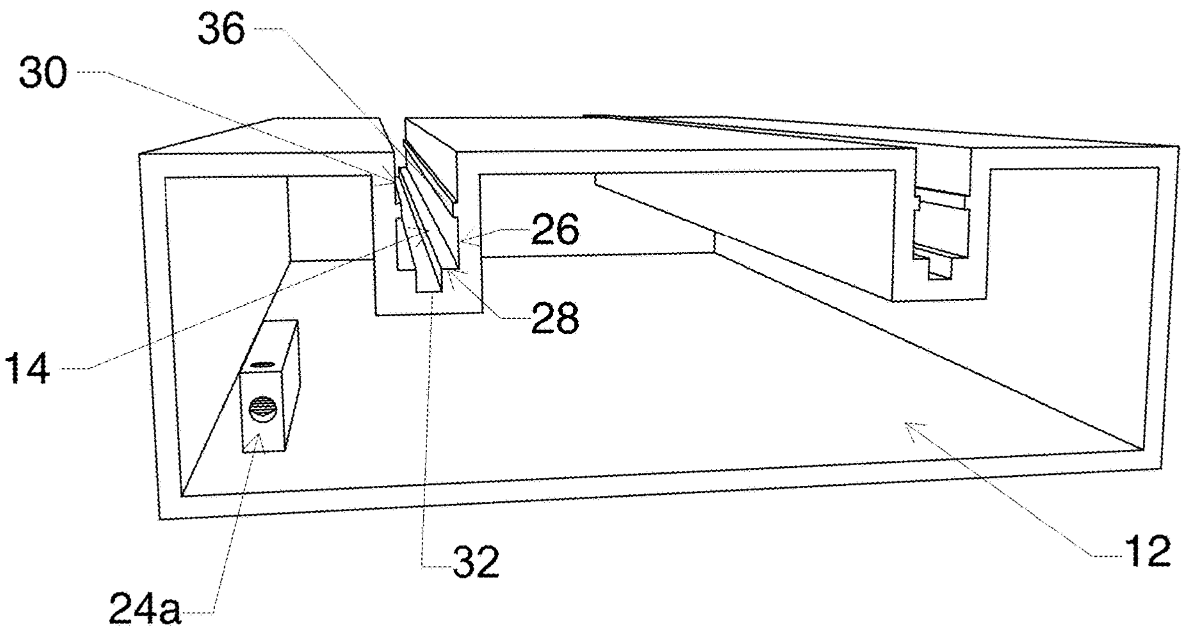
FIG. 4 shows a cross-sectional view taken along line AA of the linear light module of FIG. 1 showing the power supply box.
Figure 5:
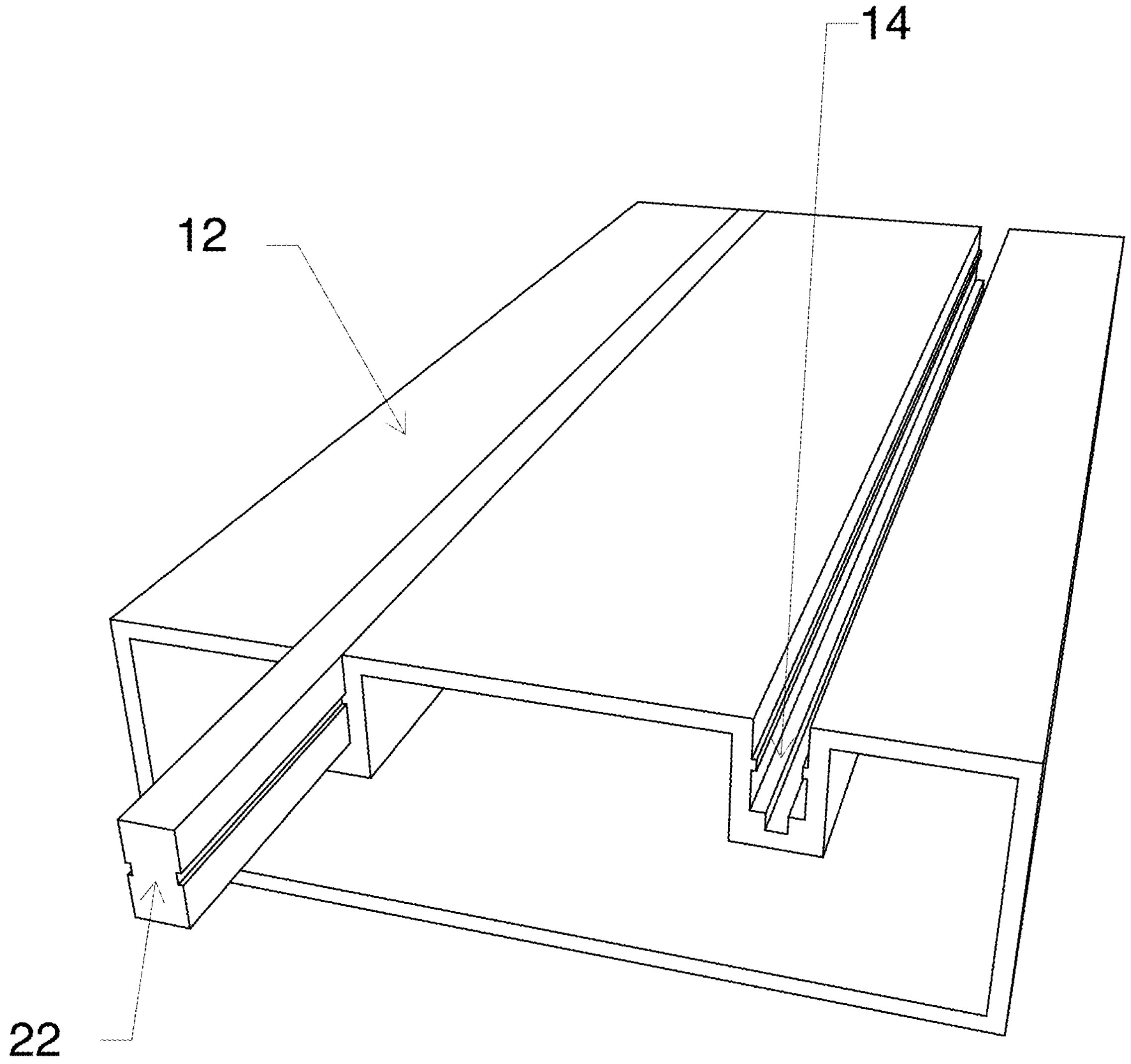
FIG. 5 shows the linear light module of FIG. 1 including one neon LED strip(s) and/or flexible rope light(s) on the corresponding channel.
Figure 6:
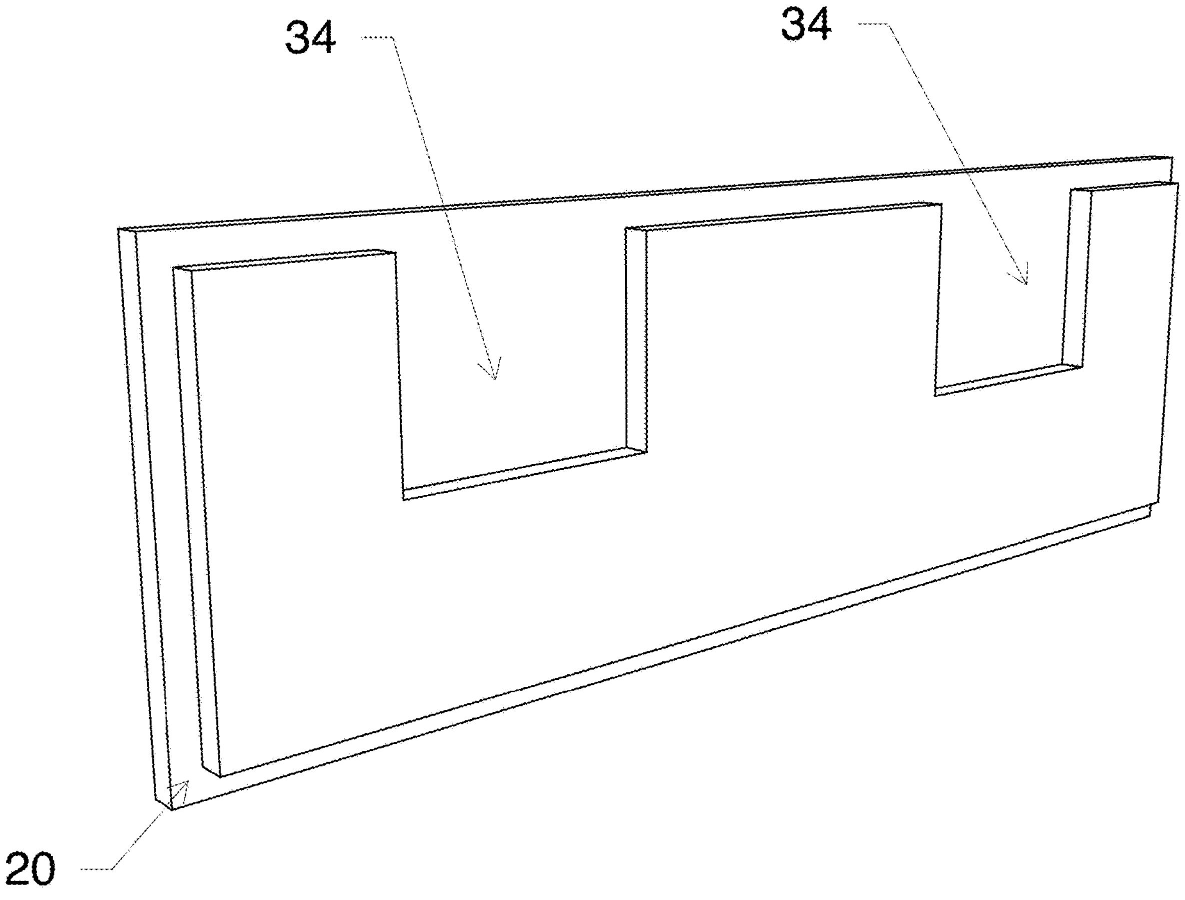
FIG. 6 shows a front view of the top cover of the linear light module of FIG. 1.
Figure 7:
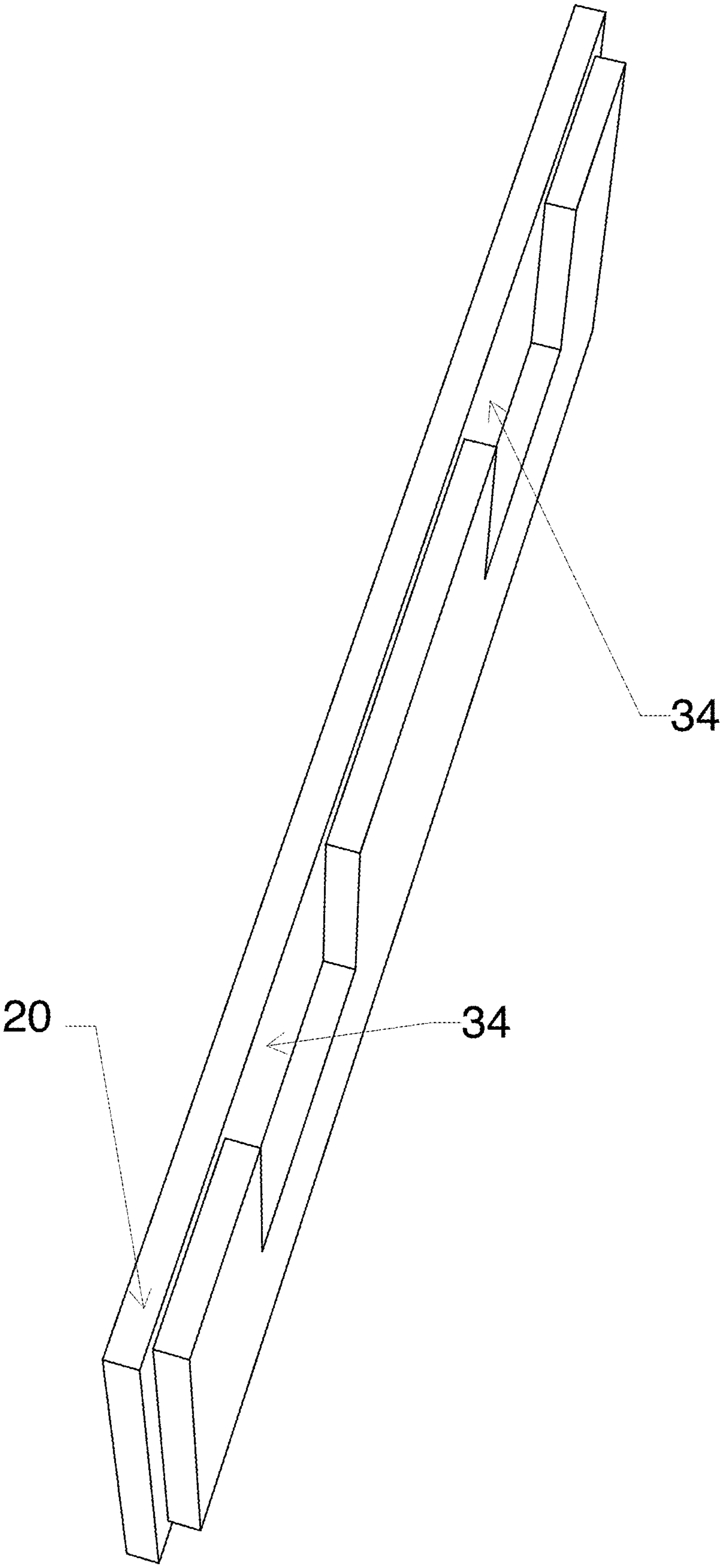
FIG. 7 shows a side view of the top cover of the linear light module of FIG. 6.
Figure 8:
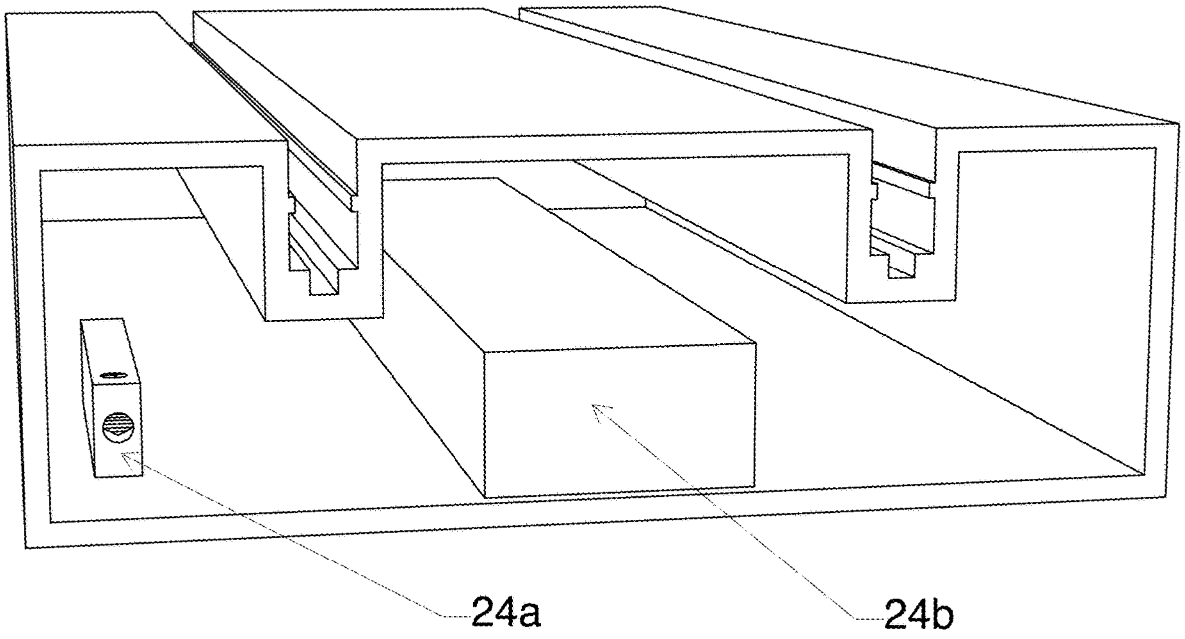
FIG. 8 shows the power supply box of the present invention.
Figure 9:
FIG. 9 shows the linear light module of FIG. 1 being used to illuminate an exterior area.
Figure 10:
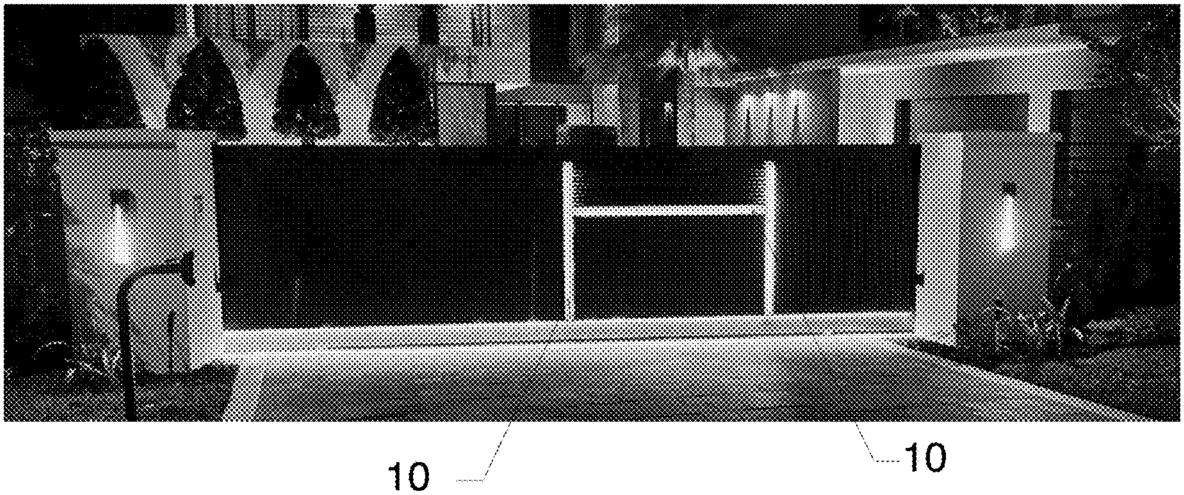
FIG. 10 shows the linear light module of FIG. 1 being used to illuminate another exterior area.

As can be seen from FIGS. 1-10, the linear light module 10 houses a plurality of neon LED strip(s) and/or flexible rope light(s). The linear module 10 can be mounted on various interior and exterior structures and protects the light string from damage and allows the light to be guided to the required area.

As can be seen in FIGS. 1-10, the linear light module 10 includes a hollow housing 12 having at least one U-shaped channel 14, a set of tracks 16 (FIG. 4) located inside each one of the channels 14, a top cover 18, a bottom cover 20, optionally and mounting system (not shown) located on a back section of the hollow housing. The flexible neon LED strip(s) and/or flexible rope light(s) 22 are placed inside the U-shaped channel 14.

Hollow Housing

The hollow housing 12 may be made of any sturdy material, preferably a metal, for example, aluminum, brass, copper, or stainless steel.

The hollow housing 12 may have any shape, for example, rectangular, square, triangular, circular, semi-circular, S-shape, H-shape, U-shape, C-shape, etc.

The hollow housing 12 is preferably manufactured in a molding process. Other methods may be used to manufacture the hollow housing, for example, extrusion or casting.

The hollow housing 12 may be between 0.5 inches-100 feet in length, preferably 1-8 feet; between 1-100 inches in width, preferably 6 inches; and between 0.5 to 100 inches deep, preferably 2 inches.

The hollow housing 12 encloses at least one ground block or ground 24*a* to ground the power. In addition, inside the hollow housing 12 is a power supply or led driver 24*b*. The lights are hardwired with three conductors connected to building power (Hot, Neutral, and Ground) (not shown) but may vary if color lights are used through an LED Driver which transforms high voltage (Ex. 120 Volts or 220 Volts Etc.) into low voltage (24 Volts or 12 Volts, Etc.).

The connection of the elements inside the hollow housing is a standard connection as known by those skilled in the art. The elements inside the hollow housing are preferably removable from the hollow housing to facilitate their replacement in case of failure. In some cases, some of the elements are fixed inside the hollow housing.

The number of power supply or led drivers 24*b* may depend on the size of the hollow housing 12 of the linear light module 10.

U-Shaped Channels

Each one of the U-shaped channels 14 is machined into the hollow housing 12 during the manufacturing process, in this way, the lights are incorporated as built-in lights into structures rather than just on top of it. For example, a gate having built-in the tracks for the lights.

Each one of the U-shaped channels 14 may have a size that allows the accommodation of the desired flexible neon LED strip(s) and/or flexible rope light(s) 22.

Each one of the U-shaped channels 14 may have side walls 26, a bottom wall 28, and an open end 30. The bottom wall 28 includes indentation 32 that protrudes downwards from the bottom wall 28 of the U-shaped channel 14. The indentation 32 may have a U-shape to facilitate the insertion of the flexible neon LED strip(s) and/or flexible rope light(s) 22.

When the flexible neon LED strip(s) and/or flexible rope light(s) 22 is pressed into the U-shaped channel 14, it is forced past the indentation 32. The flexible neon LED strip(s) and/or flexible rope light(s) 22 is placed inside the U-shaped channel 14 in the vertical direction and the indentation 32 provides the U-shaped channel with the required height to accommodate the flexible neon LED strip(s) and/or flexible rope light(s) 22. In addition, the indentation 32 helps to retain the flexible rope light strings 22 to prevent the removal thereof.

In this application, the term "flexible neon LED strip(s) and/or flexible rope light(s)" is directed to a lighting device including a light emitting source encased in an elongated hollow flexible translucent tube. The flexible neon LED strip(s) and/or flexible rope light(s) are well known in the art and commercially available from several sources. Each one of the flexible neon LED strip(s) and/or flexible rope light(s) is wired in parallel and is independent of the other flexible rope light string within the module. Thus, any failure of any electrical connection of one of the flexible rope light strings within the module does not affect the operation of other flexible neon LED strip(s) and/or flexible rope light(s).

The color of the flexible neon LED strip(s) and/or flexible rope light(s) 22 may depend on the customer requirements. The flexible light strings are commercially available.

Covers

Each one of the covers 18, 20 include grooves 34. The number of grooves 34 will depend on the number of U-shaped channels 14. The grooves 34 snap-fit into the ends of the corresponding U-shaped channel to hold and protect the interior space of the hollow housing.

The shape and size of the covers 18, 20 will depend on the shape and size of the hollow housing 12.

Tracks

Each one of the U-shaped channels 14 includes a set of tracks 16 inside. The tracks 16 include a horizontal flange 36.

The horizontal flange 36 helps to maintain the flexible neon LED strip(s) and/or flexible rope light(s) 22 in place inside the U-shaped channel 14.

The tracks are part of the dye used to extrude the metal to create the hollow housing 12.

In one embodiment, the present invention may include batteries or solar panels, as a back-up power system for emergencies.

The invention claimed is:

1. A linear light module comprising:
- a hollow housing;
- at least one U-shaped channel located in the hollow housing;
- a set of tracks located inside each one of the U-shaped channels;
- a horizontal flange located on each one of the set of tracks;
- a top cover located at a top end of the hollow housing, the top cover including grooves,
- a bottom cover located at a bottom end of the hollow housing, the bottom cover including grooves; and
- optionally a mounting system located on a back section of the hollow housing;
- wherein the grooves of the top cover snap-fit into the top end of the hollow housing;
- wherein the grooves of the bottom cover snap-fit into the bottom end of the hollow housing;
- wherein at least one of a flexible neon light emitting diode (LED) strip(s) and a flexible rope light is placed inside each one of the U-shaped channels.

2. A linear light module comprising:
- a hollow housing;
- at least one U-shaped channel located in the hollow housing;
- a set of tracks located inside each one of the U-shaped channels;
- a top cover located at a top end of the hollow housing;
- a bottom cover located at a bottom end of the hollow housing; and
- optionally a mounting system located on a back section of the hollow housing;
- wherein at least one of a flexible neon light emitting diode (LED) strip(s) and a flexible rope light is placed inside each one of the U-shaped channels;
- wherein each one of the U-shaped channels comprises side walls, a bottom wall, an open end, and indentation located on the bottom wall, wherein the indentation protrudes downwards from the bottom wall of the U-shaped channel.

3. The linear light module according to claim 1, wherein the flexible neon LED strip(s) and/or flexible rope light(s) is pressed into the U-shaped channel in a vertical position.

4. The linear light module according to claim 3, wherein the flexible neon LED strip(s) and/or flexible rope light(s) is forced past through the indentation.

5. The linear light module according to claim 2, wherein the indentation has a U-shape.

* * * * *